(12) United States Patent
Kaufhold et al.

(10) Patent No.: US 6,365,674 B1
(45) Date of Patent: Apr. 2, 2002

(54) THERMOPLASTIC POLYURETHANE RESIN

(75) Inventors: Wolfgang Kaufhold, Leverkusen (DE);
James W. Rosthauser, Glendale, WV (US); Jeffrey S. Wiggins, Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 1195 days.

(21) Appl. No.: 08/802,294

(22) Filed: Feb. 18, 1997

Related U.S. Application Data

(63) Continuation-in-part of application No. 08/402,594, filed on Mar. 13, 1995, now abandoned.

(51) Int. Cl.[7] .............................. C08F 8/00; C08F 8/30; C08L 75/00; C08G 18/00

(52) U.S. Cl. ..................... 525/127; 525/131; 528/28; 528/44; 528/76; 528/84; 528/85

(58) Field of Search ................................ 525/131, 127; 528/28, 76, 84, 85, 44

(56) References Cited

U.S. PATENT DOCUMENTS

| 4,242,468 A | * | 12/1980 | Baack et al. ................. 521/170 |
| 4,383,050 A | * | 5/1983 | Nisseu et al. ................ 521/174 |
| 4,752,626 A | | 6/1988 | Hoye et al. .................. 521/175 |
| 4,883,837 A | | 11/1989 | Zabrocki ....................... 525/66 |
| 5,332,786 A | | 7/1994 | Nagata et al. ............... 525/130 |
| 5,486,570 A | * | 1/1996 | St. Clair ...................... 525/123 |

FOREIGN PATENT DOCUMENTS

EP          197260          3/1985

OTHER PUBLICATIONS

CA Selects Plus: Polyurethanes, Abstract 1999:271427 for WO 9919406 A1, "Compatibilized blends of a thermoplastic elastomer and a polyolefin", Apr. 22, 1999.*

* cited by examiner

*Primary Examiner*—Patrick D. Niland
(74) *Attorney, Agent, or Firm*—Joseph C. Gil; Aron Preis

(57) ABSTRACT

A thermoplastic polyurethane resin prepared by reacting an isocyanate, a polyol and a reactive polyolefin, and a chain extender, is disclosed. It was surprisingly and unexpectedly found that the inventive resin forms compatible blends with polyolefins.

19 Claims, No Drawings

THERMOPLASTIC POLYURETHANE RESIN

CROSS REFERENCE TO RELATED APPLICATION

This application is a Continuation-in-Part of application Ser. No. 08/402,594, filed Mar. 13, 1995, now abandoned.

FIELD OF THE INVENTION

The invention relates to polyurethanes and more particularly to a thermoplastic molding composition containing a resinous blend of polyurethane and a polyolefin.

SUMMARY OF THE INVENTION

A thermoplastic polyurethane resin which is prepared by reacting an isocyanate, a polyol and a reactive polyolefin, and a chain extender, is disclosed. It was surprisingly and unexpectedly found that the inventive resin forms compatible blends with polyolefins.

BACKGROUND OF THE INVENTION

Conventional thermoplastic polyurethane resins are the reaction product of a diisocyanate, a chain extender (a short chain diol) and a polyol. It has long been recognized that such polyurethane resins are incompatible with, and hence not easily blended with, polyolefins such as polyethylene and polypropylene. This incompatibility results in inhomogeneous blends which tend to delaminate and often feature poor mechanical properties.

U.S. Pat. No. 4,883,837 and the document mentioned there as prior art reflect the many attempts to make compatible blends of polyolefins with thermoplastic polyurethane. Note may also be made of U.S. Pat. No. 4,752,626 which disclosed a polyisocyanate prepared from a polyol blend containing polyolefinic polyol. A polyolefin diol was referred to in U.S. Pat. No. 5,332,786 as a reactant with diisocyanate in the preparation of an adhesive.

DETAILED DESCRIPTION OF THE INVENTION

The reactants necessary in the preparation of the thermoplastic polyurethane resin of the present invention comprise (i) at least one member selected from among aliphatic and aromatic isocyanates, and (ii) at least one polymeric polyol, most preferably a member selected from between polyester polyol and polyether polyol, and (iii) a reactive polyolefin which contains at least one member selected from hydroxyl, amine and carboxylic acid functional groups, and (iv) a chain extender.

Importantly, the amount of said (iii) is at least 1.0 equivalent %, preferably at least 8 equivalent %, relative to the amount of said (ii) and the ratio of said isocyanate equivalents to equivalents of active hydrogen-containing materials is within the range of 0.90:1 to 1.10:1, and preferably, 0.95:1 to 1.05:1.

The chain extender suitable in the present context is a $C_{2-10}$ hydrocarbon compound having an isocyanate-reactive chain termination. In a preferred embodiment of the invention, the chain extender is hydroxy and/or an amine terminated. In a further embodiment of the invention, additional polyols may be included as reactants.

An additional embodiment of the invention relates to a thermo-plastic composition containing a blend of the polyurethane of the invention and polyolefin resin. The polyurethane of the invention was found to be more compatible with polyolefin than other prior art polyurethanes.

The isocyanate suitable in the present invention is any of the organic isocyanates previously disclosed as suitable in the preparation of TPU resins, preferably diisocyanates, and include aliphatic, aromatic and cycloaliphatic diisocyanates, and mixtures thereof.

Illustrative isocyanates but non-limiting thereof are methylenebis(phenyl isocyanate) including the 4,4'-isomer, the 2,4'-isomer and mixtures thereof, m- and p-phenylene diisocyanates, chlorophenylene diisocyanates, a,a'-xylylene diisocyanate, 2,4- and 2,6-toluene diisocyanate and the mixtures of these latter two isomers which are available commercially, tolidine diisocyanate, hexamethylene diisocyanate, 1,5-naphthalene diisocyanate, isophorone diisocyanate and the like; cycloaliphatic diisocyanates such as methylenebis(cyclohexyl isocyanate) including the 4,4'-isomer, the 2,4'-isomer and mixtures thereof, and all the geometric isomers thereof including trans/trans, cis/trans, cis/cis and mixtures thereof, cyclohexylene diisocyanates (1,2-; 1,3-; or 1,4-, 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), 4,4'-diisocyanatodicyclohexyl, and all geometric isomers and mixtures thereof and the like. Also included are the modified forms of methylenebis(phenyl isocyanate). By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,883,571; 4,031,026; 4,118,411; and 4,299,347. The modified methylenebis (phenyl isocyanates) also include those which have been treated so as to convert a minor proportion of the diisocyanate to the corresponding carbodiimide which then interacts with further diisocyanate to form uretone-imine groups, the resulting product being a stable liquid at ambient temperatures as described, for example, in U.S. Pat. No. 3,384,653. Mixtures of any of the above-named isocyanates can be employed if desired.

Preferred classes of organic diisocyanates include the aromatic and cycloaliphatic diisocyanates. Preferred species within these classes are methylenebis(phenyl isocyanate) including the 4,4'-isomer, the 2,4'-isomer, and mixtures thereof, and methylenebis(cyclohexyl isocyanate) inclusive of the isomers described above.

The preferred isocyanates are methylene bis(phenyl isocyanate) and methylene bis(cyclohexyl isocyanate).

The polymeric diols suitable in the context of the invention are those conventionally employed in the art for the preparation of TPU resins. The formation of soft segments in the resulting polymer is attributed to the polymeric diols. Preferably, the polymeric diols have molecular weights (number average) within the range of 500 to 10,000, preferably 1000 to 4,000. Naturally, and often times advantageously, mixtures of such diols are also possible. Examples of the suitable diols include polyether diols, polyester diols, hydroxy-terminated polycarbonates, hydroxy-terminated copolymers of dialkyl siloxane and alkylene oxides such as ethylene oxide, propylene oxide and the like, and mixtures thereof.

Examples of suitable polyether polyols include polyoxyethylene glycols, polyoxypropylene glycols which, optionally, have been capped with ethylene oxide residues, random and block copolymers of ethylene oxide and propylene oxide; polytetramethylene glycol, random and block copolymers of tetrahydrofuran and ethylene oxide and/or propylene oxide. The preferred polyether polyols are random and block copolymers of ethylene and propylene oxide of functionality approximately 2.0 and polytetramethylene glycol polymers of functionality about 2.0.

The suitable polyester polyols include the ones which are prepared by polymerizing ε-caprolactone using an initiator such as ethylene glycol, ethanolamine and the like, and those prepared by esterification of polycarboxylic acids such as phthalic, terephthalic, succinic, glutaric, adipic, azelaic and the like acids with polyhydric alcohols such as ethylene glycol, butanediol, cyclohexane-dimethanol and the like. An example of a suitable polyester polyol is butanediol adipate.

Among the suitable amine-terminated polyethers, mention may be made of the aliphatic primary diamines structurally derived from polyoxypropylene glycols. Polyether diamines of this type are available under the trademark JEFFAMINE from Jefferson Chemical Company.

Examples of polycarbonates containing hydroxyl groups include those prepared by reaction of diols such as propane-1,3-diol, butane-1,4-diol, hexane-1,6-diol, 1,9-nonanediol, 2-methyloctane-1,8-diol, diethylene glycol, triethylene glycol, dipropylene glycol and the like with diarylcarbonates such as diphenylcarbonate or with phosgene.

Examples of suitable silicon-containing polyethers include copolymers of alkylene oxides with dialkylsiloxanes such as dimethyl-siloxane and the like; other suitable silicon-containing polyethers have been disclosed in U.S. Pat. Nos. 4,057,595 and in 4,631,329 both of which documents are incorporated herein by reference.

Preferred diols are polyether diols and polyester diols as referred to above.

Suitable chain extenders which are used in the preparation of the polyurethane resin of the invention include any of those known in the TPU art disclosed above. Typically the extenders may be aliphatic straight and branched chain diols having from 2 to 10 carbon atoms, inclusive, in the chain. Examples of suitable diols include ethylene glycol, 1,3-propanediol, 1,4-butanediol, 1,5-pentanediol, 1,6-hexanediol, neopentyl glycol, and the like; 1,4-cyclohexanedimethanol; hydroquinone-bis-(hydroxyethyl) ether; cyclohexylenediols (1,4-, 1,3-, and 1,2-isomers), isopropylidenebis(cyclohexanols); diethylene glycol, dipropylene glycol, ethanolamine, N-methyldiethanolamine, and the like; and mixtures of any of the above. Minor proportions (less than about 20 equivalent percent) of the difunctional extender may be replaced by trifunctional extenders and/or monofunctional extenders, without adversely effecting the thermoplasticity of the resulting TPU resin; illustrative of such extenders are glycerol, trimethylolpropane, and 1-octadecanol and the like.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, and diethylene glycol, either alone or in admixture with each other or with one or more of the aliphatic diols which were named previously. Particularly preferred diols are 1,4-butanediol, 1,6-hexanediol and 1,4-cyclohexanedimethanol.

The equivalent proportions of polymeric diol to said extender may vary considerably depending on the desired hardness for the TPU resin. In general, the proportions fall within the range of from about 1:1 to about 1:20, preferably from about 1:2 to about 1:10. At the same time, the overall ratio of isocyanate equivalents to equivalents of active hydrogen containing materials is within the range of 0.90:1 to 1.10:1, and preferably, 0.95:1 to 1.05:1.

The reactive polyolefin suitable in the context of the invention contains at least one member selected from hydroxyl, amine and carboxylic acid functional groups. Preferably, the reactive polyolefin is a reactive poly(ethylene/butylene)copolymer. Most preferably the reactive polyolefin conforms to

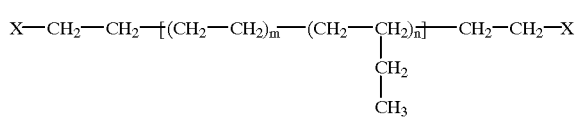

where X denotes an isocyanate-reactive group selected from among hydroxyl, amine and carboxylic acid functional groups, and where m is about 0 to 550, preferably 0 to 220 and n is about 0 to 270, preferably 110 to 0 and the number average molecular weight of the copolymer is about 500 to 15,000, preferably 1,000 to 6,000 g/mol and its functionality is in the range of about 1.7 to 2.5, preferably about 2.0.

The preferred reactive polyolefin is hydroxyl terminated poly(ethylene/butylene) copolymer having a molecular weight of about 4400 g/mol. Such copolymer is available commercially from Shell as Kraton HPVM2201.

The preparation of the TPU resin of the invention follows procedures and methods which are conventional and which are well known to the art-skilled. If desired, the polyurethanes can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

It is frequently desirable, but not essential, to include a catalyst in the reaction mixture employed to prepare the thermoplastic resin of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science 4, 207–211, 1960. Such catalysts include organic and inorganic acid salts of, and organometallic derivatives of bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethyl-ethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

The thermoplastic composition of the invention comprises a blend containing about 1 to 99, preferably about 40 to 80 wt % of the thermoplastic polyurethane resin described above and a complementary amount of polyolefin. The polyolefin suitable in the context of the inventive blends is well known and readily available in commerce. Normally, the polyolefin has a weight average molecular weight of about 50,000 to 2,000,000, preferably 200,000 to 1,000,000. Among the suitable polyolefins, mention may be made of polyethylene, polypropylene, polybutadiene and polybutylene. The preferred polyolefin is LDPE.

The preparation of the composition of the invention follows conventional means and procedures which are well known in the art.

The invention is further illustrated but is not intended to be limited by the following examples in which all parts and percentages are by weight unless otherwise specified.

EXAMPLES

Experimental

In carrying out the experiments leading up to the present invention use was made of the following materials:

Kraton HPVM2201: compound, a product of Shell. This poly(ethylene/-butylene)copolymer is hydroxy terminated and has a molecular weight of about 4400 g/mol (herein reactive polyolefin).

Desmophen 2502: equivalent poly(butylene/adipate), 2000 molecular weight (herein polyol); 1,4 butanediol (herein chain extender), and MDI.

A control polyurethane formulation was prepared from 100 parts polyol, 9.9 parts chain extender and 40 parts MDI (CONTROL).

A polyurethane formulation in accordance with the invention was prepared from 92 parts polyol, 17.4 parts reactive polyolefin, 9.9 parts chain extender and 40.0 parts of MDI.

The compositions containing the polyurethane of the invention were prepared by the "prepolymer method" and by the "one shot process"; no differences in compatibilization attributable to the processes were indicated.

Preparation by the Prepolymer Method

The polyol and reactive polyolefin (where relevant) were charged to a three-neck, round bottom flask equipped with a stirrer, a thermometer and a gas adapter. The materials were stirred to form a mixture which was heated to about 80° C. under a nitrogen blanket. The MDI which was kept at about 50 to 55° C. was then added while stirring continued for about 2 hours to form a prepolymer. The prepolymer was discharged to a can and held at 100 to 120° C. Chain extension at an isocyanate to a hydroxyl ratio of 1.02 was attained by adding the chain extender (at 80 to 100° C.) to the stirred prepolymer along with about 20 ppm (relative to the formulation) of tin dibutyldilaurate catalyst. Stirring continued for 10 to 20 seconds.

The solution was poured into a preheated teflon-lined mold and cured in an infra-red oven at 120° C. for about 4 minutes and then at 100° C. for another 4 minutes. The resulting slab was removed from the oven and allowed to cool to room temperature.

Preparation by the One Shot Process

The polyol, reactive polyolefin and chain extender were charged into a can and the mixture stored in an oven at 100 to 120° C. for about 1 to 3 hours. To the rapidly stirred mixture, MDI, kept at 50 to 55° C. was added in one lot. The mix was stirred rapidly for 20 to 40 seconds and then 10 to 30 ppm of tin dibutyldilaurate was added and stirring continued for an additional 10 to 20 seconds.

The solution was poured into a preheated teflon-lined mold and cured in an infra-red oven at 120° C. for about 4 minutes and then at 100° C. for another 4 minutes. The resulting slab was removed from the oven and allowed to cool to room temperature.

Processing

A slab prepared as described above was cut into strips, ground and then extruded in a single screw extruder at a temperature in the range of about 350 to 380° C. The extrudate was then pelletized and dried. Blends of the LDPE with the polyurethane were prepared in a twin screw extruder and the composition in pelletized form was then molded (injection molding) to produce test specimens. The table below summarizes the results of the tests. In the table, composition A denotes a commercial grade of thermoplastic polyurethane; B denotes a control composition containing 60% of A and 40% LDPE; C denotes a composition in accordance with the invention containing 60% of the polyurethane prepared as described above and 40% LDPE.

| Composition | A | B | C |
|---|---|---|---|
| Tensile Strength, KSI | 4.6 | 1.4 | 1.9 |
| Taber abrasion, g | 290 | 1181 | 539 |
| Elongation at Break, % | 502 | 189 | 569 |

The significant decrease in material loss (Taber abrasion) and the increase in the elongation-at-break value is a clear indication of the compatibility which characterizes the composition of the invention.

In a yet additional series of experiments, the compositions were prepared containing 60 parts by weight (pbw) of thermoplastic polyurethane (MTPU) and 40 pbw of LDPE.

The preparation of the MTPU of Example D (by the Prepolymer Method) entailed the following materials:

92 parts (1.00 equivalent) Desmophen 2502

17.4 parts (0.86 equivalent) Kraton HPVM 2201

9.9 parts (2.39 equivalent) 1,4-butanediol, and about 40.0 parts (3.48 equivalent) MDI The formulation used in preparing MTPU in Blend E (by the Prepolymer Method) entailed the following materials:

96 parts (1.00 equivalent) Desmophen 2502

8.7 parts (0.04 equivalent) Kraton HPVM 2201

9.9 parts (2.27 equivalent) 1,4-butanediol, and about 40.1 parts (3.31 equivalent) MDI.

The difference between the MTPU was that in D the formulation represents about 8 equivalent % replacement of polyol, and that in E the replacement is about 4 equivalent % replacement.

The results of testing are shown below:

| Composition | D | E |
|---|---|---|
| Tensile Strength, KSI | 1.85 | 1.75 |
| Taber abrasion, g | 577 | 886 |
| Elongation at Break, % | 483 | 289 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a polyurethane resin, the reactants used in its preparation comprise
    (i) at least one member selected from the group consisting of aliphatic and aromatic diisocyanates,
    (ii) at least one polymeric diol having a number average molecular weight of 500 to 10,000, selected from the group consisting of polyester polyol, polyether polyol, hydroxy-terminated polycarbonates and hydroxy-terminated copolymers of dialkyl siloxane and alkylene oxides, (iii) a reactive polyolefin containing isocyanate-reactive groups identical one to the other conforming to

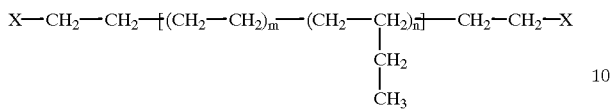

where X denotes an isocyanate-reactive group identical one to the other selected from the group consisting of hydroxyl, amine and carboxylic acid functional groups, and where m is about 0 to 550 and n is about 0 to 270 and the number average molecular weight of said reactive polyolefin is about 500 to 15,000 g/mol and its functionality is in the range of about 1.7 to 2.5, and (iv) a chain extender, with the proviso that said (iii) is present in an amount of at least 1.0 equivalent % relative to the amount of said (ii).

2. The thermoplastic molding composition of claim 1 wherein said (iii) is poly(ethylene/butylene) diol.

3. The thermoplastic molding composition of claim 2 wherein said (ii) is polyester polyol.

4. The thermoplastic molding composition of claim 2 wherein said (ii) is poly(butanediol adipate).

5. The thermoplastic molding composition of claim 4 where said (i) is a diisocyanate.

6. The thermoplastic molding composition of claim 5 wherein said (i) is an aromatic diisocyanate.

7. The thermoplastic molding composition of claim 4 wherein said (ii) is at least one polymeric diol having a number average molecular weight of 1000 to 4,000 selected from the group consisting of polyester polyol and polyether polyol.

8. The thermoplastic molding composition of claim 5 wherein said (ii) is at least one polymeric diol having a number average molecular weight of 1000 to 4,000 selected from the group consisting of polyester polyol and polyether polyol.

9. The thermoplastic molding composition of claim 4 wherein said (i) is an aliphatic diisocyanate.

10. The thermoplastic molding composition of claim 5 wherein said (i) is an aromatic diisocyanate.

11. A thermoplastic molding composition comprising a polyurethane resin, the reactants used in its preparation comprise (i) at least one member selected from the group consisting of aliphatic and aromatic diisocyanates, (ii) at least one polymeric diol having a number average molecular weight of 500 to 10,000 selected from the group consisting of polyester polyol, polyether polyol, hydroxy-terminated polycarbonates and hydroxy-terminated copolymers of dialkyl siloxane and alkylene oxides, (iii) a reactive poly(ethylene/butylene)copolymer which contains two isocyanate-reactive groups identical one to the other selected from the group consisting of hydroxyl, amine and carboxylic acid functional groups, (iv) a chain extender, wherein number average molecular weight of said reactive poly(ethylene/butylene)copolymer is about 500 to 15,000 g/mol and its functionality is in the range of about 1.7 to 2.5 and wherein said (iii) is present in an amount of at least 1.0 equivalent % relative to the amount of said (ii).

12. The thermoplastic molding composition of claim 11 wherein said reactive poly(ethylene/butylene)copolymer has a number average molecular weight of about 1,000 to 6,000.

13. The thermoplastic molding composition of claim 11 wherein said reactive poly(ethylene/butylene) copolymer has a functionality of about 2.0.

14. The thermoplastic molding composition of claim 1 further comprising a polyolefin resin.

15. The composition of claim 14 wherein said polyolefin resin is a member selected from the group consisting of polyethylene and polypropylene.

16. The composition of claim 14 wherein said reactive polyolefin has a number average molecular weight of 1,000 to 6,000 g/mol.

17. The composition of claim 14 wherein said m is about 0 to 220 and n is about 110 to 0.

18. The thermoplastic molding composition of claim 1 wherein said polymeric diol is polytetramethylene glycol.

19. The thermoplastic molding composition of claim 1 wherein said (iii) is present in an amount of at least 8 equivalent % relative to the amount of said (ii).

* * * * *